(12) United States Patent
Dai

(10) Patent No.: US 6,918,207 B2
(45) Date of Patent: Jul. 19, 2005

(54) MOISTURIZED, SOILLESS, ROOT-CULTURE PLANTER

(76) Inventor: Shih-Hsien Dai, 1F, No.35, Lane 44, Sec. 1, Chung Yang Road, Sanchung, Taipei Hsien (TW)

( * ) Notice: Subject to any disclaimer, the term of this patent is extended or adjusted under 35 U.S.C. 154(b) by 0 days.

(21) Appl. No.: 10/610,811

(22) Filed: Jul. 2, 2003

(65) Prior Publication Data

US 2005/0011123 A1 Jan. 20, 2005

(51) Int. Cl.$^7$ ................................................ A01G 9/02
(52) U.S. Cl. .......................................................... 47/81
(58) Field of Search .............................. 47/79, 80, 81, 47/65.7; 208/423

(56) References Cited

U.S. PATENT DOCUMENTS

| | | | | |
|---|---|---|---|---|
| 2,084,005 A | * | 6/1937 | Richards | 47/80 |
| 3,995,397 A | * | 12/1976 | Despard, III | 47/81 |
| 4,369,598 A | * | 1/1983 | Beckwith | 47/61 |
| 4,728,286 A | * | 3/1988 | Olsen | 431/320 |
| 5,111,614 A | * | 5/1992 | Holtkamp, Sr. | 47/81 |
| 5,491,929 A | * | 2/1996 | Peacock et al. | 47/84 |
| 6,006,472 A | * | 12/1999 | Holtkamp, Jr. | 47/79 |
| 6,418,664 B1 | * | 7/2002 | Shaw | 47/79 |
| 6,555,069 B1 | * | 4/2003 | Ferguson | 422/126 |
| 6,637,156 B2 | * | 10/2003 | Stewart | 47/82 |
| 2001/0016305 A1 | * | 8/2001 | Chen | 431/324 |
| 2003/0108461 A1 | * | 6/2003 | Lo | 422/305 |

FOREIGN PATENT DOCUMENTS

JP    2000102325 A  *  4/2000  ............ A01G/9/02

* cited by examiner

*Primary Examiner*—Jeffrey L. Gellner
(74) *Attorney, Agent, or Firm*—Troxell Law Office, PLLC

(57) ABSTRACT

A moisturized, soilless, root-culture planter provides a water storage space that is sealed by a cover unit. A planter unit is assembled in the container, with the bottom extended to include a water channel to suck water from the container to the planter unit, to maintain a moisturized status. The planter unit provides a hollow planting space for direct insertion for growth of a plant root. Such a structure completely seals off a planting environment containing water without soil. Even when the container is overturned, water is still contained to maintain the planting environment for growth. So there is no risk of contamination that may be caused by spilling water and soil.

8 Claims, 9 Drawing Sheets

MOISTURIZED, SOILLESS, ROOT-CULTURE PLANTER

BACKGROUND OF THE INVENTION

The conventional planter is completely of open type, providing different measurements of filling spaces for refilling of soil or cultivating soil (pebbles) or other similar cultivating substances, for planting different plants. On the bottom of the container is a water outlet to discharge excessive water. Such planter has the following shortcomings:

1. With a completely open type of planter, the culture medium, particularly the soil, is completely exposed to the ambient environment and air. With moisture, the germs or other matter in the air will directly fall on the culture medium. So the culture medium in a regular container generally has a surface filled with moulds or worms, causing environmental contamination, or influence to the growth of the plant, and becomes a breeding ground for germs.
2. Such a completely open type of planter is often overturned accidentally or by a foreign force, resulting in direct falling down of the culture medium, such as soil, and subsequent contamination to the environment that requires labor and time for consuming cleaning and rearrangement of the planter, the plant and the culture medium. In particular, the small potted plants placed on an office table or an office environment would easily be overturned, spilling water and oil that cause environment pollution to the table, or even the electronic appliances on the table, such as computer and telephone sets.
3. The water of draining hole at the bottom of the conventional planter will often cause environment contamination when discharging excessive water out of the container. Meanwhile, the out-flowing soil or pebbles look dirty and the culture medium inside the container, particularly soil, will be reduced gradually.
4. Due to regional and seasonal influences, the relative humidity and coldness under the natural climate or in an indoor environment are exposed directly to evaporation. As a result, the water content in the culture medium, particularly the soil will evaporate, and the growth of the plant will be inhibited. Then, the cultivator must pay more care and time to look after the plant. That could be an extra burden to a busy worker in the industrial or commercial sector.
5. Because of the completely open and direct exposure of the culture medium, and the discharge and evaporation of water content out of the water drain outlet, the planter needs to be watered at least once or two times a day, or the lack of moisture will inhibit its growth or even cause it to wither away.

Aimed at the aforementioned shortcomings in the use of conventional planters and plant pots, businessmen have come up with a variety of different planter constructions, or different planting media and so-called high-tech soil products available on the market.

Such new types of planter construction introduced to the market generally involves additional equipment of a water bottle, or direct installation of a water storage space on the aforementioned planter, which uses a dripping or siphoning principle to control the water content in the planting media, particularly soil, to avoid excessive watering that may drown the plant or cause contamination from excessive discharge of water from the water drain outlet. Such planting structures may have addressed the problems of conventional planters as mentioned in items 3 and 5 above. But the shortcoming mentioned in item 4 above can be slightly reduced by lengthening watering intervals from a daily basis to 3~6 days. The problems mentioned in items 1 and 2 remain to be improved because they involve completely open cultivation by direct exposure of culture medium.

As for artificial soil invented by some manufacturers, it does replace regular soil. But it needs filling process in a regular pot or glass container, so it still has the problem of overturning and spilling of the container producing a mess.

Another different structures of planter has been disclosed in Taiwan Patents Nos. 166871 and 175511, wherein:

Taiwan patent No. 166871 discloses a planter structure basically comprising a pot container and a water feeding part that are overlapped or combined as one unit. Wherein, the water feed pipe is connected to a water of storing chamber for refilling of water. Two ends of a water channel made of baked ceramics in the water feeding assembly are respectively inserted in a water storage unit and the soil filled in the pot container, thereby an appropriate amount of water is delivered by capillarity to the soil; such a structural design may have solved the problems in items 3 and 5 as found in conventional pots. As for the problem mentioned in item 4, the watering interval is extended from once a day to 3~6 days, and the watering frequency is reduced slightly. As a matter of fact, the planting method has the same problems that could not be improved, as mentioned in items 1~2 for the conventional pot planting containers.

Taiwan patent No. 175511 discloses a planter construction basically consisting of a water tank serving as a water container, on top of the container is a screen that is paved with water absorbent cotton to deliver water. Then, soil is used as a culture medium for the cultivation of a culture dish for plant, directly placed on water absorbent cotton paved on the water tank, thereby the water in the water absorbent cotton is delivered into the soil through a through hole at the bottom of the culture dish. Such a structural design can solve the above problems in items 3 and 5 for conventional planters. But the problem mentioned in item 4 remains unsolved because the watering interval is only lengthened from once per day to 3~6 days and there is a slight reduction of water frequency. Actual planting method still has the problems mentioned in items 1~2 that remain unsolved.

SUMMARY OF THE INVENTION

The invention of moisturized, soilless, root-culture planter comprises:

A container unit, the container providing a hollow space, having a bottle opening that is tightened by a cover unit to obtain complete sealing effects, the container providing a hole for assembling a planter unit;

A planter unit, matching the hole on the container unit, the planter unit serving as a culture medium and has at least one planting space;

A water channel, assembled on a bottom of the planter unit, communicating with the planting space, one end thereof extended into the container and immersed with the liquid contained therein;

With the planter unit serving as a culture medium for a plant root, and a sealed container providing a completely sealed environment for water storage and soilless cultivation, there is no risk of spilling water or soil when the container is overturned. The liquid contained in the container is capable of having a longer service duration since the container is sealed to prevent evaporation, without the need of frequent refilling, preventing the growth of mould and worms.

DETAILED DESCRIPTION OF PREFERRED EMBODIMENTS

Figure 1:
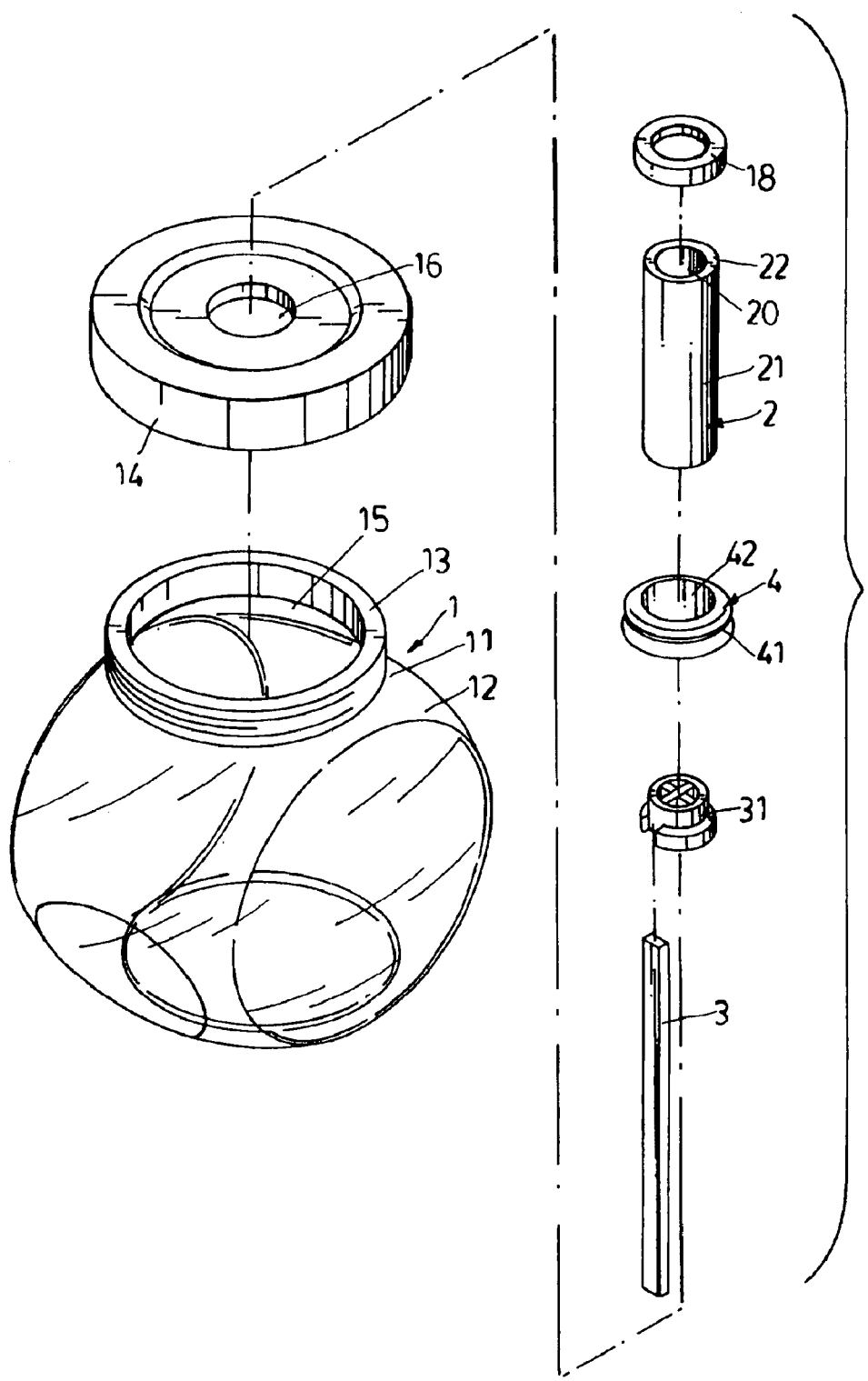
FIG. 1 is an exploded view of a first embodiment of the present invention.

As shown in FIGS. 1 to 4, the invention includes a container unit 1, the container unit 1 being optionally formed in a variety of shapes and specifications; planter unit 2 assembled within the container unit 1, and a water channel 3 installed between container unit 1 and planter unit 2, as in FIG. 1, wherein The container unit 1 includes a container 11, the container 11 consisting of a bottle body 12 having a sealed bottom and a bottle opening 13. The bottle body 12 provides a hollow three-dimensional containing space 15 for storing a culture liquid, such as water or culture agent or nutritious liquid; a cover unit 14 to be matched and tightened onto the bottle opening 13 of the container 11 to permit complete sealing effect and have the sealed containing space 15, thereby keeping the culture liquid sealed inside without any risk of leakage. The cover unit 14 is at least one opening for assembling at least one planter unit 2.

Said container unit 1 is optionally made of transparent or translucent material in different shapes and specifications; selectively by baking a ceramic container to form, or through the processing of glass, acrylic, plastic or other materials that can be used for liquid containing purposes.

At least one planter unit 2, directly fitted into hole 16 on the cover unit 14 with the help of a position secured member 4. Instead of being limited to vertical arrangement, the planter unit 2 and the cover unit 14 is optionally made in different assembling angles or configurations. In the present embodiment, planter unit 2 is optionally designed in the shape of a long pipe 21, having a hollow center space, providing at least one planting space 20 and concurrently serving to define the media of planting, forming a cultural environment without the need of filling any culture media, such as soil, cultivating soil or pebbles, artificial soil, or other similar cultivating materials, thereby the plant and its roots are directly inserted in the planting space 20 through the opening 22 of the planter unit 2 extending from the top of the cover unit 14. Meanwhile, the opening 22 is optionally an expanded neck having a diameter slightly larger than the hole 16, for securing purpose onto the planter unit 2. Of course, it is optionally assembled by means of a mounting unit 18 as shown in FIG. 1, having a diameter slightly larger than the hole on the cover unit, for securing onto the planter unit 2. Another end of the planter unit 2 is extended into container 11 and the sealed containing space 15. The liquid contained inside the container 11 is transmitted through the water channel 3 to the water containing, moisturized and air permeable planter unit 2, providing an appropriate amount of water required by the plant.

The planter unit 2 has a capillary structure for obtaining better water containing, moisturizing, and air permeable characteristics that are needed for the growth of plant roots, so the plant can obtain sufficient but not excessive moisture and an air permeable space for root growth without soil. Therefore, planter unit 2 is optionally made of baked earthenware, or foam materials, or other types of cotton material or non-woven materials, or plastic ware, or other materials having water containing, moisturizing and air permeable capillary properties, or a combination of the above materials.

The planter unit 2, optionally made in different single-unit shapes made of the above materials according to design or actual requirements, is assembled onto the cover unit 14 and extended into container 11, or is optionally made in the shape of the above container unit 1, or has a monolithic form at the bottom inside the container 11 or fixed, by gluing or plain placement, extending upwards for assembly.

The position secured member 4 is made of a material having excellent water resistance, having an outside groove 41 on an outside perimeter thereof, the groove 41 having a height equivalent or smaller than the thickness of the end side of the cover unit 14. The diameter of the groove is equal to the diameter of the hole on the cover unit 14, so that the position secured member 4 is justly fitted into the hole 16 on the cover unit 14. Meanwhile, the position secured member 4 provides a center hole 42, the hole diameter being equal or smaller than the shape and outside diameter of the planter unit 2, permitting directly fitting of the planter unit 2 in the center hole 42 so the planter unit 2 and the hole 16 of the cover unit 14 are sealed and assembled in position by the position secured member 4.

The water channel 3 for transmission between the container unit 1 and the planter unit 2 is a length of a belt shape or strip member, preferably made of water-absorbent materials like cotton or non-woven fabric. One end of the water channel 3 is formed or wound to have a form equal or slightly larger than the diameter of the planting space 20 of the planter unit 2, directly matching the planter unit 2 in the container 11 and joined with the planting space 20, or fitted with a mounting member 31, as shown in FIG. 1, communicating with the bottom of the planter unit 2 and the planting space 20 in the container 11. Another end of the water channel 3 is extended and immersed in the liquid contained inside the container 11, absorbing and transmitting water to the planter unit 2.

Figure 2:
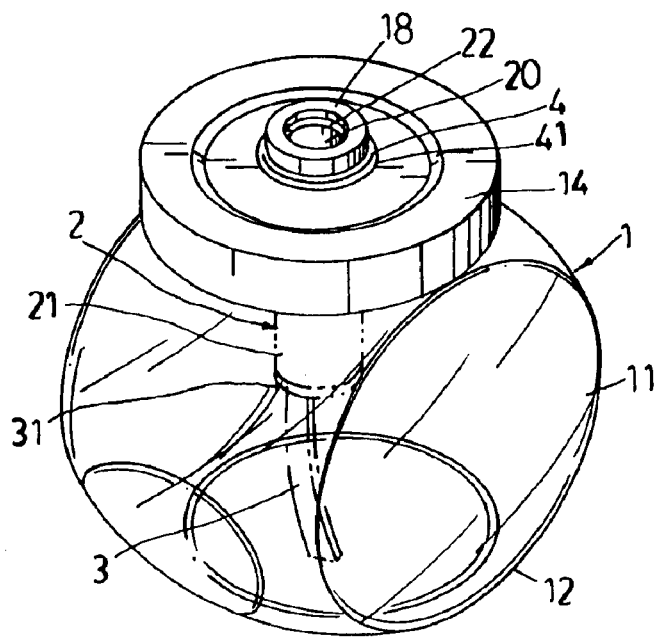
FIG. 2 is a stereo assembled view of the first embodiment of the invention.
Figure 3:
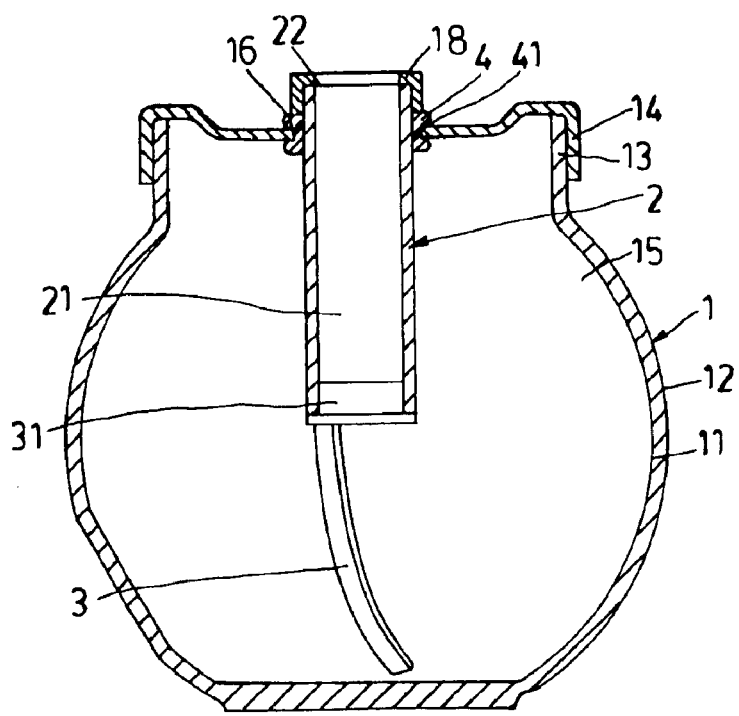
FIG. 3 is a sectional assembled view of the first embodiment of the invention.
Figure 4:
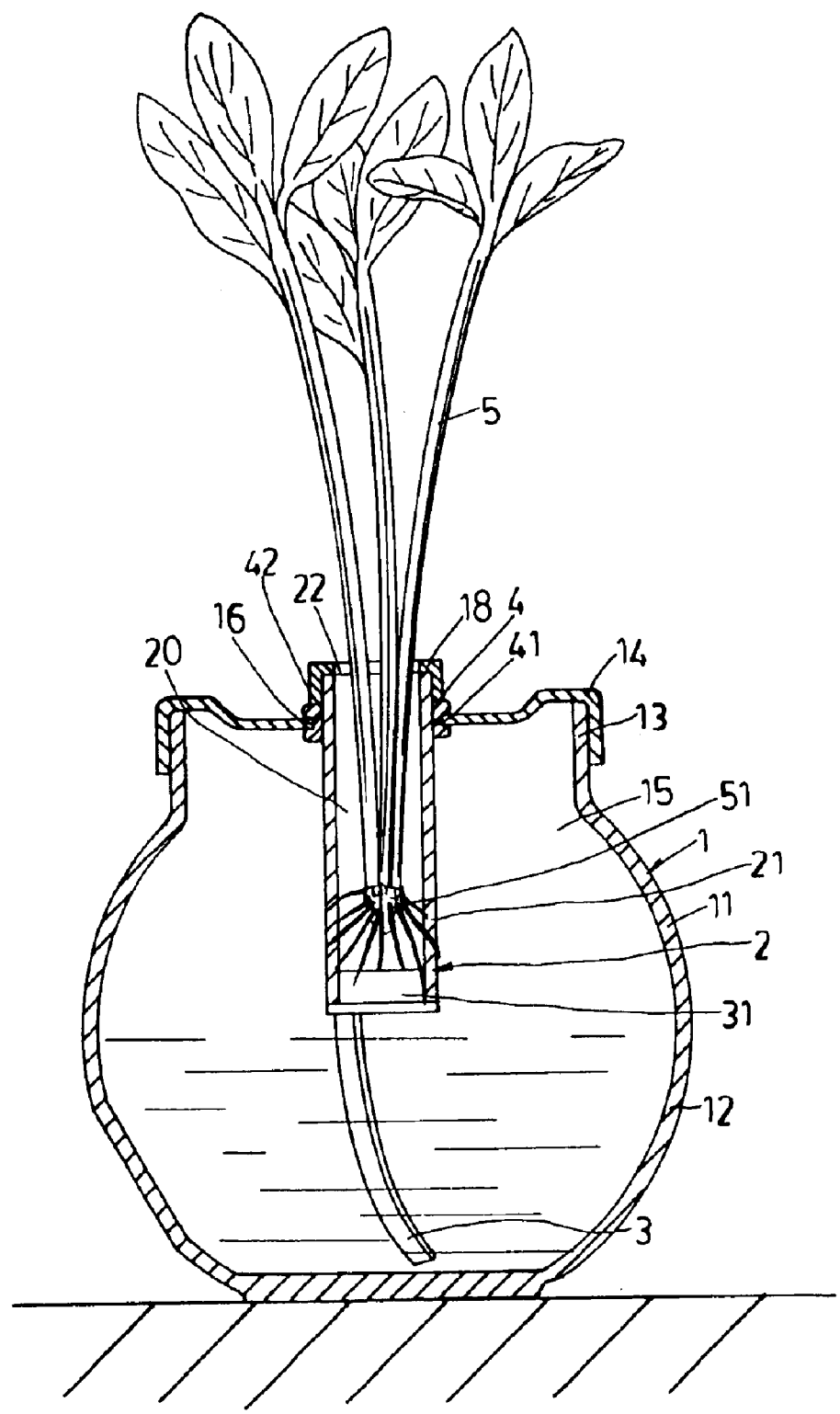
FIG. 4 is a sectional assembled view of the first embodiment of the invention with a plant inside therein.
Figure 6:
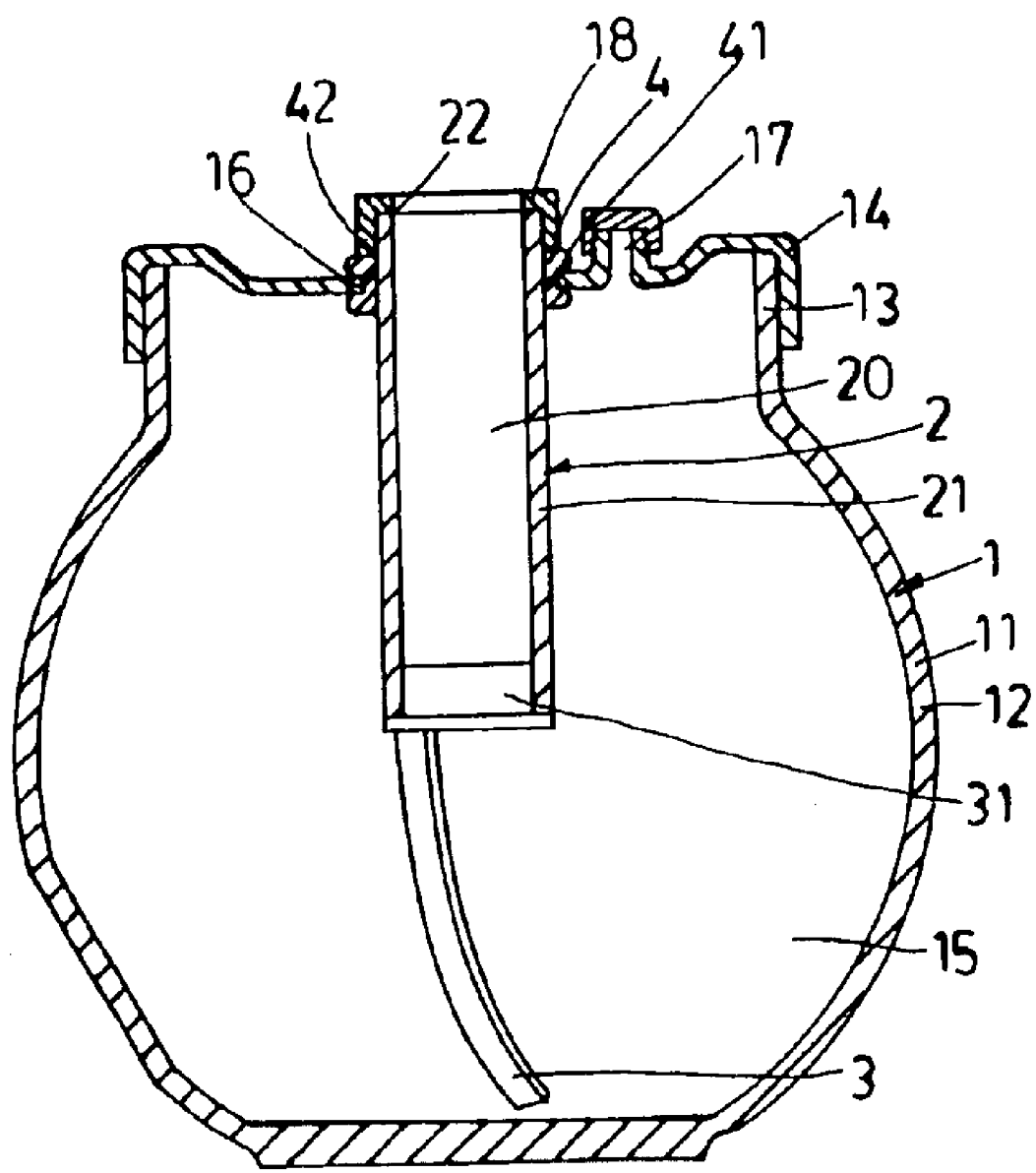
FIG. 6 is a schematic sectional view of the cover unit installed in the opening of the invention.

The foregoing embodiment is assembled and used in a way shown in FIGS. 2 to 4. The planter unit 2 is air-tighten assembled in the hole 16 of the cover unit 14 by means of the position secured member 4. The container 11 is also sealed by tightened the cover unit 14 after water is filled therein. Meanwhile, the water channel 3 at the bottom of the planter unit 2 is also extended and immersed in the liquid contained therein, as shown in FIGS. 2 and 3. Thereby, the liquid is taken up and delivered to the planter unit 2 by capillarity, forming a humid space for growth with the help of the water containing, moisturizing and capillary air permeable properties of the planter unit 2, the planter unit 2 serves as a cultivating medium and constitutes a completely sealed liquid storage and soiless planting environment. Then, the root 51 of the plant 5 is directly inserted into the planting space 20 through the opening 22 on top of the cover unit 14, as shown in FIG. 4, so the root 51 can directly obtain required moisture or nutrients from the planter unit 2 with excellent water containing, moisturizing and capillary air permeable properties. The root 51 can grow and extend inside the planter unit 2, or cling to the capillaries of the planter unit 2. Meanwhile, liquid can be filled in easily by opening the cover unit 14 and the bottle opening 13 on the container 11. Then the cover unit 14 is tightened onto the container 11 to form once again a sealed status. Of course, it can also be designed to have a re-sealable refill opening 17 on a side of the cover unit 14, as shown in FIG. 6, to facilitate refilling of liquid inside the container 11.

Figure 5:
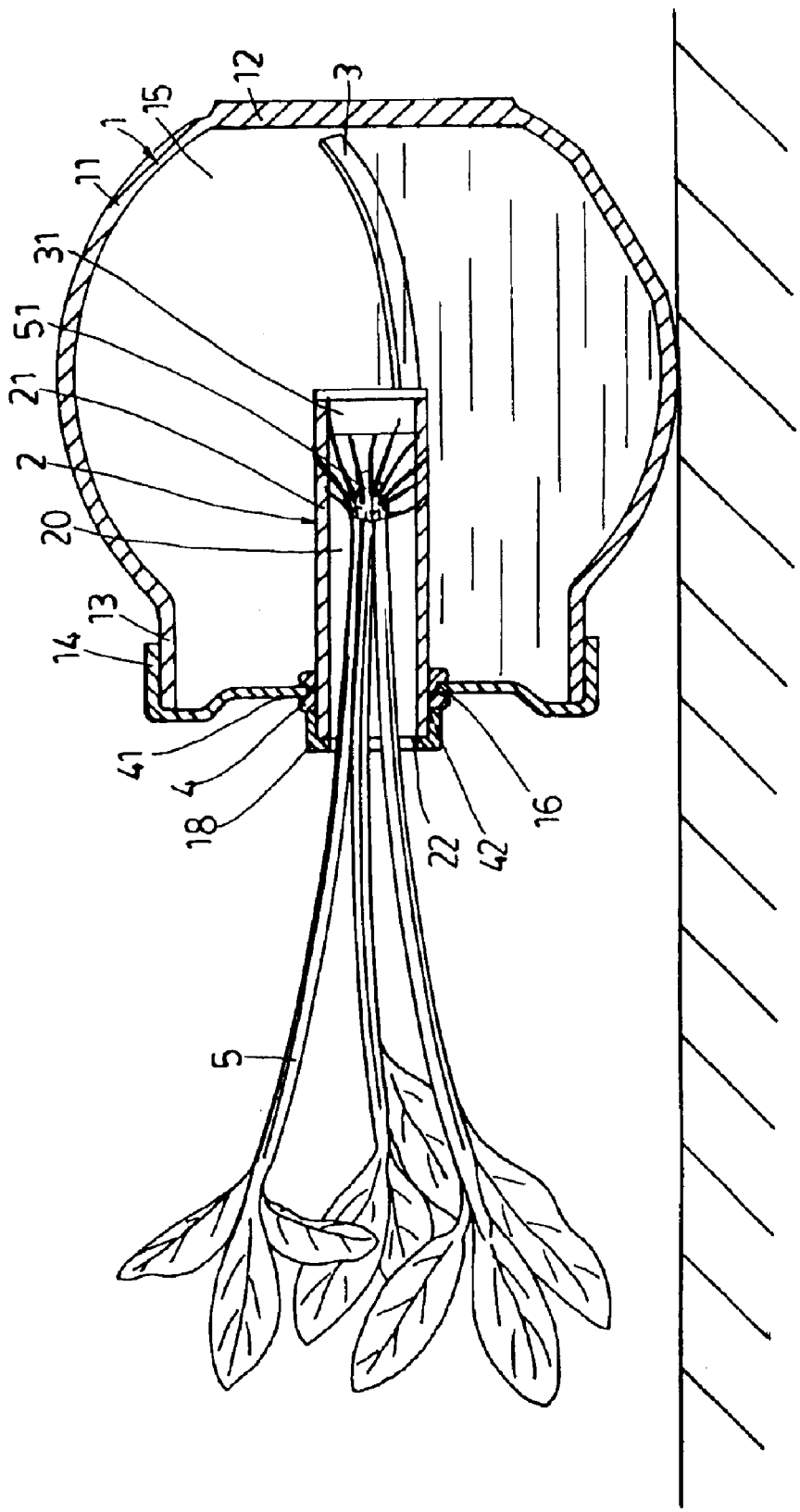
FIG. 5 is a schematic view of the first embodiment of the invention when it is overturned sideways.

In the foregoing planting structure, the liquid is completely sealed and contained in the container, and the planter unit 2 is directly used as a medium for planting without the need of soil or similar media, forming a completely neat and sealed planting environment. Even if the container unit 1 is overturned, as in FIG. 5, the liquid is completely sealed within the container 11 without the risk of water or oil spilling out to cause a mess. Meanwhile, the liquid contained therein is sealed to prevent evaporation, so the liquid contained inside the container 11 will last longer without frequent refilling, so that there is no environment to allow the growth of mould or worms; there is no chance that a small planter (tabletop type) will overturn or the need to sprinkle water that may cause damage to the tabletop or the electronic appliances such as computer and telephone on the table.

Figure 7:
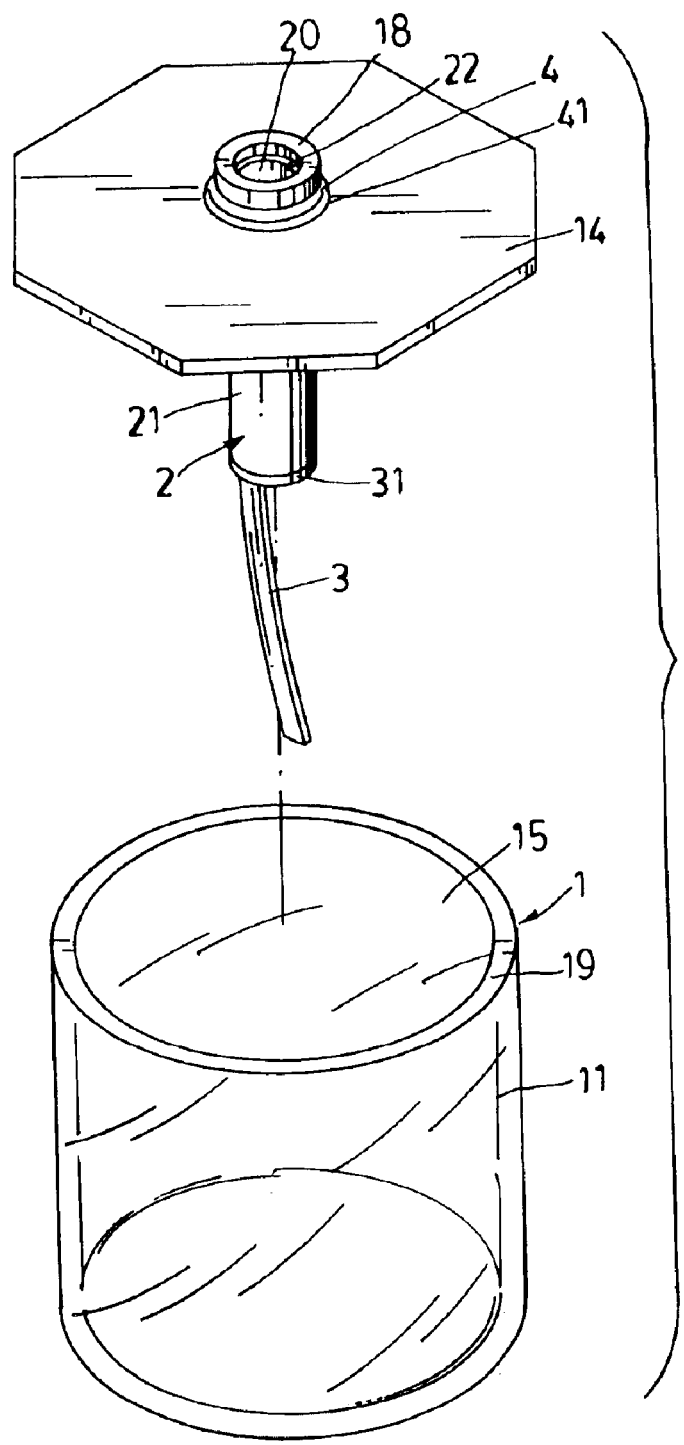
FIG. 7 is a partially exploded view of a second embodiment of the invention.
Figure 8:
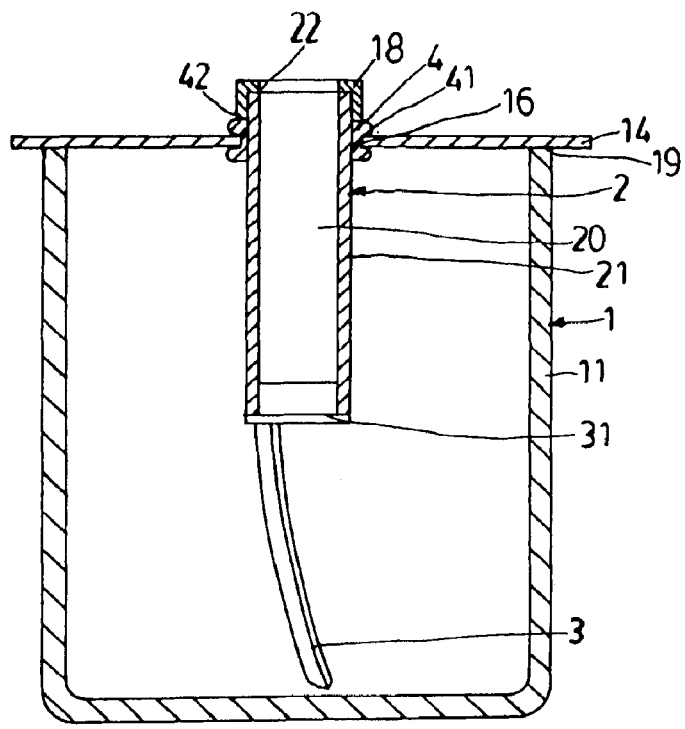
FIG. 8 is a sectional assembled view of the second embodiment of the invention.
Figure 9:
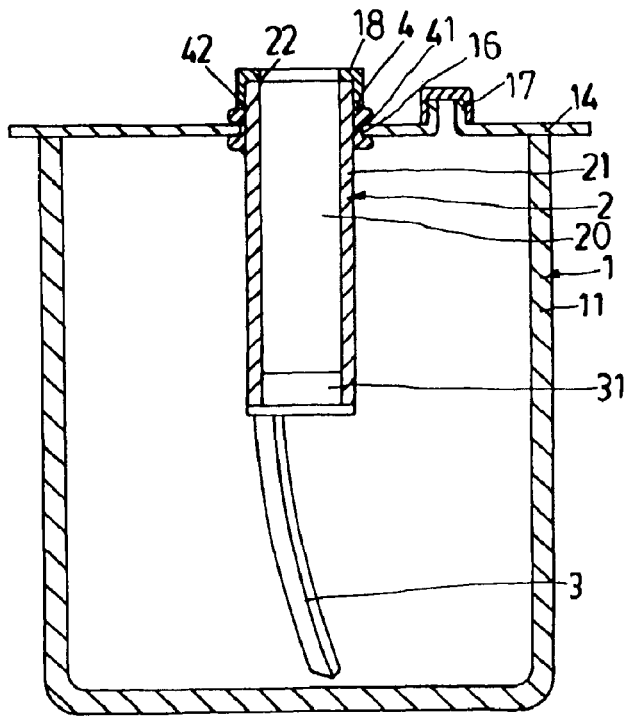
FIG. 9 is a sectional assembled view of a third embodiment of the invention.

The structural contents of the invention can be modified for applications without departing from the spirit and scope of design. FIGS. 7 to 9 illustrated another embodiment of the invention. The cover unit 14 of the container unit 1 provides at least one hole 16, permitting at least one planter unit 2 and the position secured member 4 to be directly mounted on the cover unit 14, and a water channel 3 is provided at the bottom of the planter unit 2.

The cover unit 14 and the container 11 are assembled to suit actual requirements and the planting environment. If there is no risk of overturning, the cover unit 14 optionally seals directly the bottle opening 19 of the container 11, to facilitate convenient lifting of the cover for refilling of liquid, as shown in FIGS. 7 and 8; the cover unit 14 is optionally fixed, optionally by gluing process, to the bottle opening 19 of container 11, with a refilling opening 17 designed on a side of the cover unit 14, to facilitate refilling of liquid inside the container, as shown in FIG. 19.

Besides the assembly of the container unit 1 to at least one planter unit 2 by installing it to the hole 16 on the cover unit 14, one or more holes can be designed directly on one side of the container unit 1, for assembling at least one planter unit 2, to obtain the same planting effects.

Figure 10:
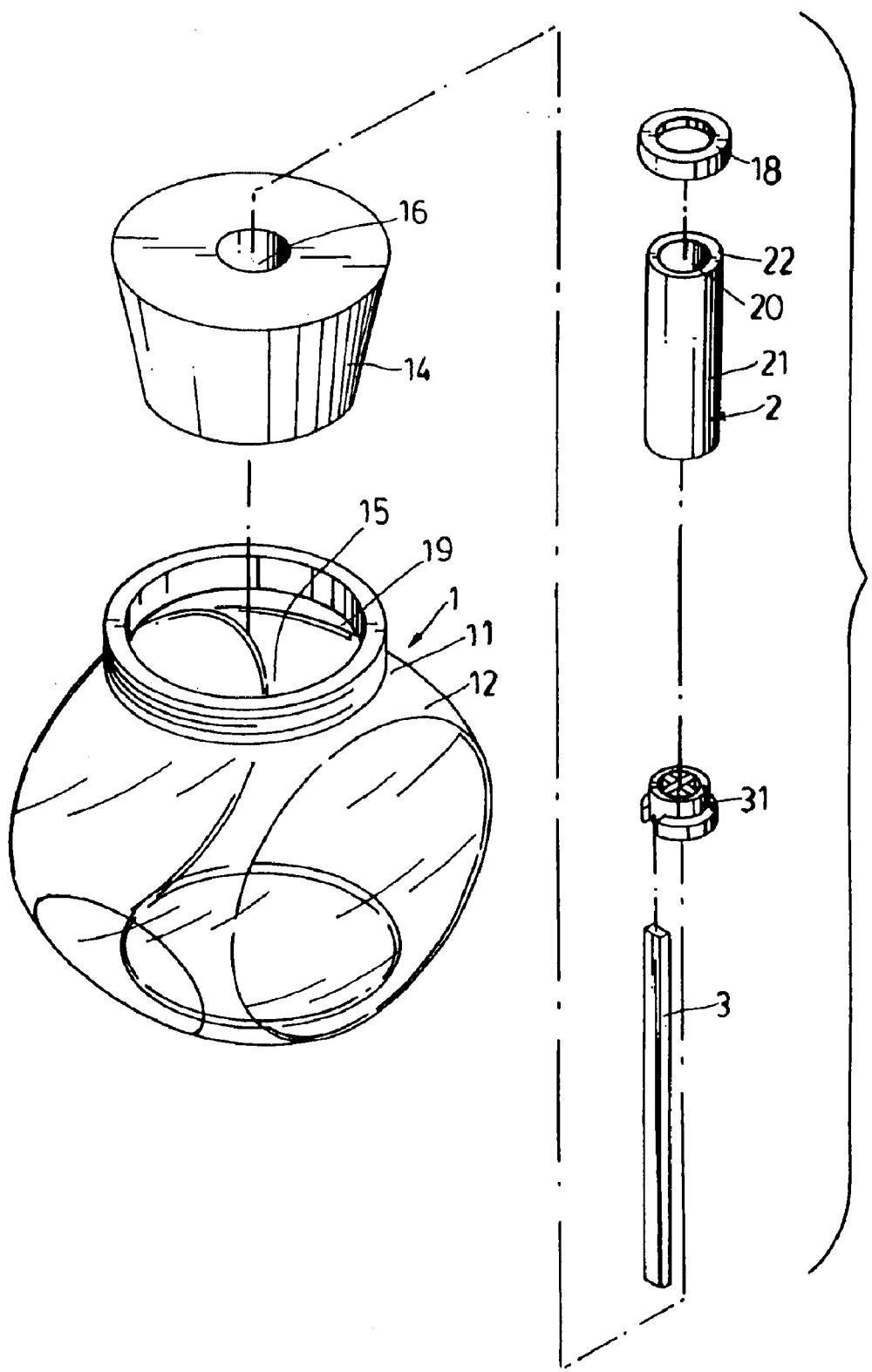
FIG. 10 is an exploded view of a fourth embodiment of the invention.
Figure 11:
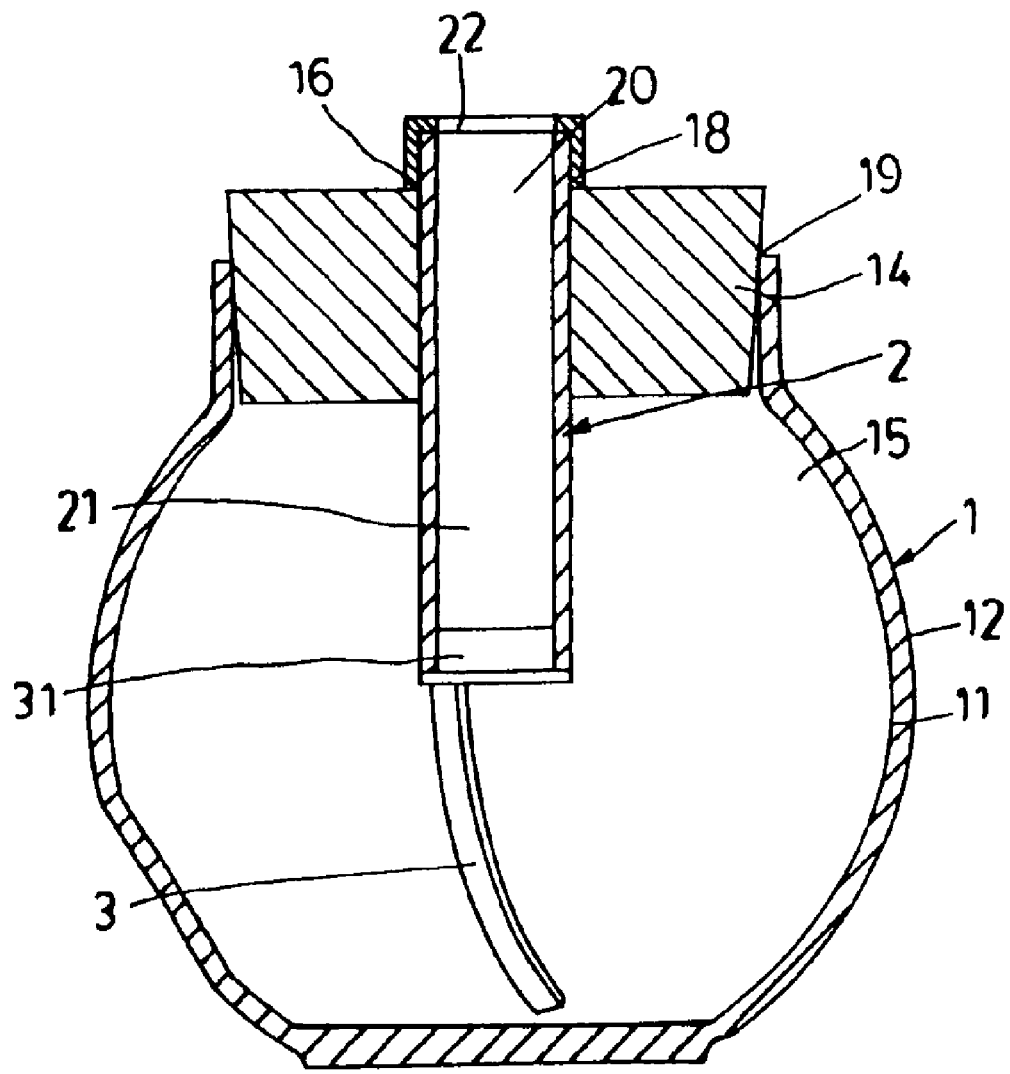
FIG. 11 is a sectional assembled view of the fourth embodiment of the invention.

FIGS. 10 and 11 show another embodiment of the invention, wherein the planter unit 2 is directly fitted into the container 11, and on the bottom of the planter unit 2 is installed a water channel 3, and A container unit 1, including a container 11, the container 11 is including a bottle body 12 and a bottle opening 19. The bottle body 12 provides a hollow containing space 15, for constant storage of culture liquid, such as water, or other culture liquid or nutritious liquid; the cover unit 14 is optionally disposed to match and directly fitted into the bottle opening 19 of the container 11 for complete sealing effects, thereby having a sealed containing space 15, so the culture liquid is sealed and contained therein without the risk of leaking if overturned. On one side of the cover unit 14 is at least one through hole 16 permitting assembly for at least one planter unit 2.

The cover unit 14 is made of flexible materials, preferably cork or rubber or polystyrene product. The cover unit 14 is shaped to have a diameter slightly larger than the diameter of the bottle opening 19, so that a force is applied to push the cover unit 14 into position in the bottle opening 19 of the container 11. Meanwhile, the diameter of the hole on the side of the cover unit 14 is preferably slightly smaller than the outer diameter of the planter unit 2, to obtain the effects of proper fitting and sealing. Of course, the foregoing shall not be based to limit the diameter thereof.

Such a structural design is capable of obtaining the effects of a sealed container unit 1 permitting storage of the planting liquid, and refilling of liquid when the cover unit 14 is opened, and the planter unit 2 enables the root of the plant 5 to cling in a space for growth and acquisition of moisture. Even when the container is overturned, the planting environment is maintained without contamination that may be caused by dumping of soil.

What is claimed is:

1. A root-culture-planter for supplying a liquid comprising:
    a) a container unit having:
        i) a bottle body with an interior sealing space for holding the liquid and a bottle opening; and
        ii) a cover covering and sealing the bottle opening and having at least one cover hole;
    b) at least one position secured member inserted into one of the at least one cover hole and having a center hole;
    c) a planter unit having:
        i) a hollow interior defining at least one planting space; and
        ii) a top opening located on a first end thereof, the first end inserted into the center hole of the at least one position secured member, the planter unit protruding into the interior sealing space of the containing unit; and
    d) a water channel having a mounting member connected to a second end of the planter unit, such that the water channel is capable of suspension in the liquid.

2. The root-culture-planter according to claim 1, wherein the planter unit is a long pipe.

3. The root-culture-planter according to claim 1, wherein the at least one position secured member has an outside groove, a perimeter of the cover opening being inserted into the outside groove.

4. The root-culture-planter according to claim 1, wherein the container unit is selected from a group of materials consisting of baked earthenware, and plastic ware.

5. The root-culture-planter according to claim 1, wherein the planter unit has a capillary structure and an air permeable space.

6. The root-culture-planter according to claim 1, wherein the planter unit is selected from a group of materials consisting of baked earthenware, foam materials, cotton materials, woven materials, and plastic ware.

7. The root-culture-planter according to claim 1, wherein the container unit is transparent.

8. The root-culture-planter according to claim 1, wherein the planer unit has a top opening located above the at least one planting space and having a diameter larger than a diameter of the at least one cover hole of the cover.

* * * * *